(12) United States Patent
Miyazawa

(10) Patent No.: US 8,322,859 B2
(45) Date of Patent: Dec. 4, 2012

(54) PROJECTOR

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 390 days.

(21) Appl. No.: 12/748,792

(22) Filed: Mar. 29, 2010

(65) Prior Publication Data
US 2010/0253920 A1 Oct. 7, 2010

(30) Foreign Application Priority Data

Apr. 1, 2009 (JP) ................................. 2009-088696

(51) Int. Cl.
*G03B 21/14* (2006.01)
(52) U.S. Cl. ............................... 353/8; 353/20; 359/465
(58) Field of Classification Search ................ 353/8, 20, 353/31, 33, 34, 37, 22, 46; 359/464, 465; 348/57; 349/15
See application file for complete search history.

(56) References Cited

U.S. PATENT DOCUMENTS

| | | | |
|---|---|---|---|
| 7,329,004 B2* | 2/2008 | Arai et al. .......................... | 353/8 |
| 8,130,331 B2* | 3/2012 | Tanaka ............................... | 349/5 |
| 2005/0078278 A1* | 4/2005 | Uehara et al. .................... | 353/20 |
| 2006/0103810 A1* | 5/2006 | Ma et al. .......................... | 353/20 |
| 2008/0030687 A1* | 2/2008 | Nakane et al. ................... | 353/20 |
| 2008/0316431 A1 | 12/2008 | Okuyama et al. | |
| 2011/0242490 A1* | 10/2011 | Itoh ................................... | 353/8 |

FOREIGN PATENT DOCUMENTS

| | | |
|---|---|---|
| CN | 101329422 A | 12/2008 |
| JP | A-2003-202520 | 7/2003 |
| JP | A-2004-205919 | 7/2004 |
| JP | A-2005-115276 | 4/2005 |
| JP | A-2009-042316 | 2/2009 |

* cited by examiner

*Primary Examiner* — William C Dowling
(74) *Attorney, Agent, or Firm* — Oliff & Berridge, PLC

(57) ABSTRACT

A projector includes: a light source which emits light; a light modulating device which modulates the light emitted from the light source according to image information; an image forming system which forms an image corresponding to the optical image formed by the light modulating device of modulated light which is modulated by the light modulation device at an image forming position; a polarized light emitting unit disposed at the image forming position of the image forming system to selectively convert the polarization direction of a part of entering light; and a projecting device which projects the light from the polarized light emitting unit.

5 Claims, 5 Drawing Sheets

PROJECTOR

BACKGROUND

1. Technical Field

The present invention relates to a projector which displays a three-dimensional image.

2. Related Art

Recently, various types of projector capable of displaying a three-dimensional image have been proposed.

For example, a technology disclosed in JP-A-2005-115276 alternately produces a projection image for the right eye and a projection image for the left eye by time-sharing operation, and switches between the right eye and the left eye by time-sharing operation using polarization shutter spectacles or the like to provide three-dimensional audiovisual display.

In addition, technologies shown in JP-A-2004-205919 and JP-A-2003-202520 project an image for the right eye and an image for the left eye by using different types of polarized lights for each to provide three-dimensional audiovisual display through polarization spectacles or the like whose right eye and left eye transmit different types of polarized lights for each.

According to the technology of JP-A-2005-115276, lights for the right eye and for the left eye are alternately blocked by time-sharing operation. Thus, brightness in viewing is reduced to half of the output from the projector.

As for the technologies of JP-A-2004-205919 and JP-A-2003-202520, light modulating devices for both of the right eye and the left eye are required. In this case, the size of the projector increases, and the product cost rises.

SUMMARY

It is an advantage of some aspects of the invention to provide a projector capable of displaying a three-dimensional image while securing sufficient brightness of the projected image without increasing the size of the projector.

A projector according to an aspect of the invention includes: a light source which emits light; a light modulating device which modulates the light emitted from the light source according to image information; an image forming system which forms an image of modulated light which is modulated by the light modulation device at an image forming position; and a polarized light emitting unit disposed at the image forming position of the image forming system to selectively convert the polarization direction of a part of entering light; and a projecting device which projects the light from the polarized light emitting unit.

For example, the two types of polarized lights herein may be two types of linear polarized lights constituted by P-polarized lights parallel with the light entrance surface and S-polarized lights perpendicular to the light entrance surface. Alternatively, the two types of polarized lights may be two types of circular polarized lights having different rotation directions.

According to this structure including the image forming system and the polarized light emitting unit, the image corresponding to the optical image formed by the light modulating device can be formed on the polarized light emitting unit by using the image forming system, and two types of polarized lights can be alternately supplied from the polarized light emitting unit according to the pixel arrangement of the light modulating device. Thus, by alternately positioning image signals for the left eye and image signals for the right eye and inputting those signals to the light modulating device, an observer can observe a three-dimensional image via polarization spectacles through which one type of the polarized lights can be recognized by the left eye and the other type of the polarized lights can be recognized by the right eye.

Accordingly, the necessity for preparing light modulating devices for both of the right eye and the left eye is eliminated, and thus the size of the projector is not increased. Moreover, a projection image is produced by utilizing all of the light from the light source. Thus, the luminance of the projection image is not decreased to half unlike the case of the time-sharing display.

It is preferable that the projector further includes: a color separation element which separates the light emitted from the light source into a plurality of color lights; a plurality of light modulating devices each of which modulates the corresponding color light separated by the color separation element; a color combining device which combines modulated lights, each of which is modulated by the respective light modulating devices; and a wavelength selective polarization rotation element disposed at a position receiving light from the color combining device to selectively rotate the polarization direction of any color light contained in the color lights.

The projector of the above aspect may be a so-called three plate type projector which modulates three color lights in red (R), green (G), and blue (B) by using light modulating devices for each.

The wavelength selective polarization rotation element may be a component which selectively rotates the polarized light in the wavelength range of green (G) light.

According to this structure, the efficiency of utilization of light can be increased by using a particular color light transmitted by the color combining device such as green light as P-polarized light parallel with the light entrance surface of the color combining device to raise light-transmissivity of the green light, and using the other color light reflected by the color combining device such as red light and blue light as S-polarized lights for the light entrance surface to raise reflectance of the red and blue lights. Then, only the polarization direction of the green light is rotated to the same polarization direction of the red light and blue light at a downstream position on the optical path of the color combining device by using the wavelength selective polarization rotation element such that two types of polarized lights can be alternately and easily supplied from the polarized light emitting unit.

It is preferable that the polarized light emitting unit has a substrate on which an area having a retardation film and an area having no retardation film are alternately formed according to pixel arrangement of the light modulating device.

The polarized light emitting unit may be produced by disposing retardation films in the left-right direction in a stripe pattern, disposing retardation films in the up-down direction in a strip shape, or disposing retardation films in a checkered pattern as a scattered arrangement on the substrate according to the pixel arrangement of the light modulating device. In view of three-dimensional viewing, it is more preferable that the retardation films are provided in the left-right direction in a stripe pattern.

According to this structure, the polarized light emitting unit can be produced only by disposing the retardation films on the substrate in a striped shape. Thus, the structure of the polarized light emitting unit can be simplified.

It is preferable that the projector further includes a position control unit which controls the relative positions of the light modulating device and the polarized light emitting unit.

The position control unit may be either a component which has a transparent parallel plate disposed inclined to an optical path center axis at a position receiving light from the light modulating device and an inclination angle changing mechanism which changes the inclination angle of the transparent parallel plate, or a component which has a mechanical position control mechanism capable of controlling the position of the polarized light emitting unit within a plane containing the light entrance surface of the polarized light emitting unit.

According to this structure, the position control unit for controlling the relative positions of the light modulating device and the polarized light emitting unit is provided. Thus, the polarized light emitting unit can be highly accurately positioned according to the pixels of the light modulating device. Accordingly, the image for the left eye and the image for the right eye can be securely separated such that the projection image as the three-dimensional image can be easily recognized by the observer.

When the position control unit has the transparent parallel plate disposed inclined to the optical path center axis at the position downstream from the light modulating device on the optical path and the inclination angle changing mechanism for changing the inclination angle of the transparent parallel plate, fine adjustment of the relative positions can be performed by changing the inclination angle. Thus, the three-dimensional image produced by this structure can be further easily recognized by the observer.

When the position control unit is the mechanical position control mechanism for controlling the position of the polarized light emitting unit within the plane containing the light entrance surface of the polarized light emitting unit, the relative positions can be controlled by simplified structure.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments according to the invention are hereinafter described with reference to the drawings.

First Embodiment

Figure 1:
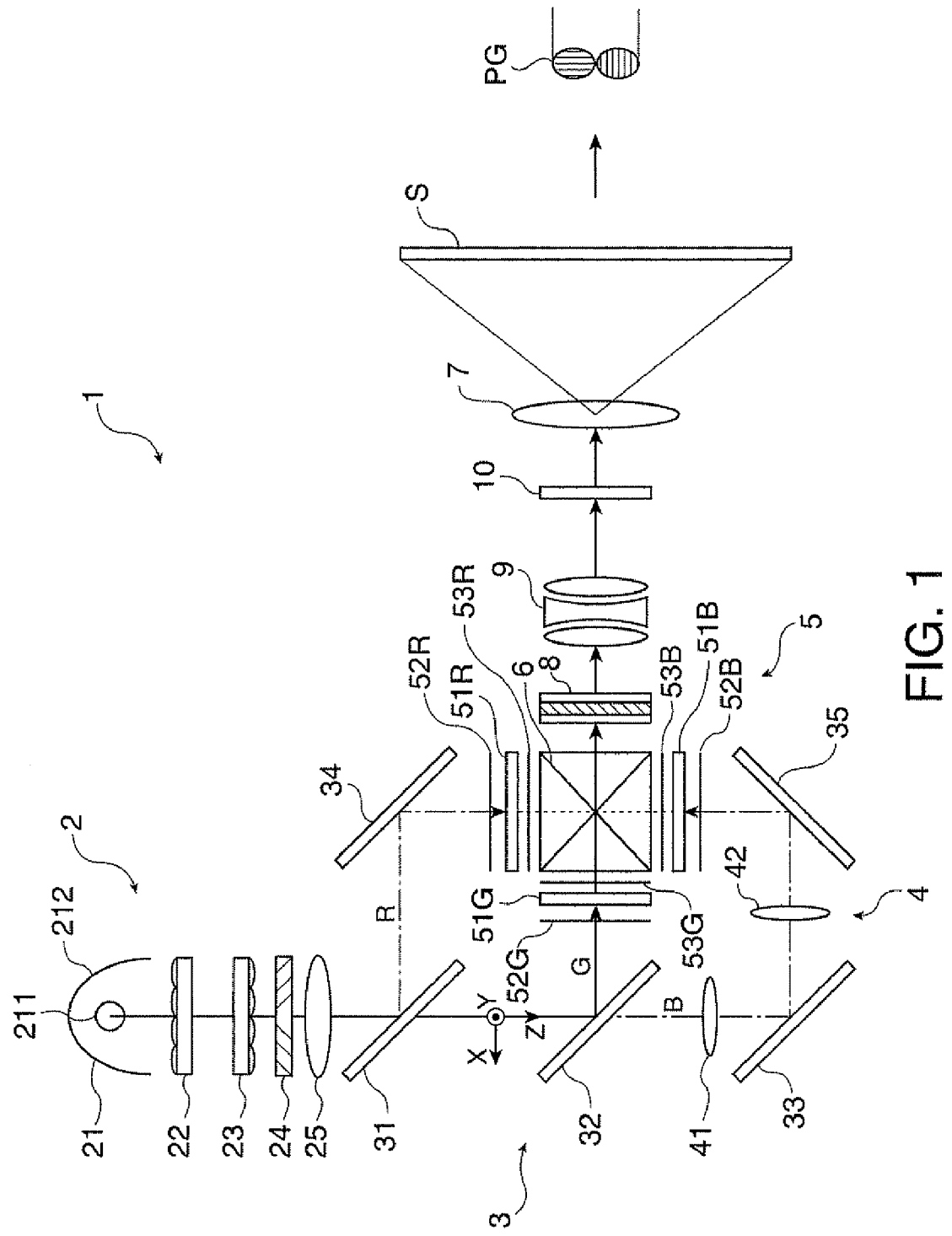
FIG. 1 schematically illustrates optical systems of a projector according to a first embodiment of the invention.

FIG. 1 illustrates optical systems of a projector 1 according to this embodiment of the invention. The projector 1 is an optical apparatus which forms an optical image by modulating light emitted from an illumination device 2 according to image information inputted from an image forming device 5, and projects the formed optical image on a screen S through a projecting device 7. The projector 1 includes the illumination device 2, a color separating device 3, a relay device 4, the image forming device 5, a color combining device 6, the projecting device 7, a wavelength selective polarization rotation element 8, an image forming system 9, and a polarized light emitting unit 10. In FIG. 1, a Z axis corresponds to a direction extending along an optical path center axis of light emitted from the illumination device 2, an X axis corresponds to a direction orthogonal to the Z axis and extending along a plane defined by the light (left-right direction), and a Y axis corresponds to a direction orthogonal to the Z axis and X axis (up-down direction).

The illumination device 2 includes a light source device 21, a first lens array 22, a second lens array 23, a polarization converting element 24, and a stacking lens 25.

The light source device 21 has a discharge-type arc tube 211 and a reflector 212.

The discharge-type arc tube 211 is a extra-high pressure mercury lamp which has a light emission portion containing a pair of electrodes and a discharge space into which mercury is sealed, and a pair of sealing portions extending away from each other with the light emission portion interposed between the sealing portions and containing electrode extension lines connected with the respective electrodes.

The reflector 212 is an optical element which reflects radiation of light emitted from the discharge-type arc tube 211 to converge the light to a reflector 212 is constituted by an ellipsoidal reflector having a spheroidal surface.

Each of the first lens array 22 and the second lens array 23 has corresponding small lenses disposed in matrix. The first lens array 22 divides the light emitted from light source device 21 into a plurality of partial lights and forms images of the partial lights in the vicinity of the second lens array 23.

The second lens array 23 stacks the plural partial lights divided by the first lens array 22 on image forming areas of respective liquid crystal panels 51R, 51G, and 51B of the image forming device 5 described later in cooperation with the stacking lens 25 disposed on the downstream optical path.

The polarization converting element 24 is an optical element which converts the lights received from the second lens array 23 into substantially one type of linear polarized lights.

The polarization converting element 24 is a plate-shaped component produced by joining slopes of plural prisms. Each of the prisms has a parallelogrammatic cross section having one diagonally opposed pair of angles of 45 degrees and the other diagonally opposed pair of angles of 135 degrees. Polarization separating films and total-reflection mirrors are alternately deposited on each of the joined interfaces.

Furthermore, a plurality of ½ wavelength retardation films are provided on the light exit surface of the polarization converting element 24 with a predetermined pitch.

When light enters the polarization converting element 24 having this structure through the surface on which the polarization separating films are formed, one of the two types of linear polarized lights passes through the polarization converting element 24 without change. However, the other type of linear polarized lights is bent by the polarization separating films substantially at a right angle, and again bent by the total-reflection mirrors at a right angle before leaving the polarization converting element 24.

The polarization direction of either of the two types of linear polarized lights is changed by 90 degrees by the ½ wavelength retardation films provided downstream. By this method, the entering lights can be converted into one type of linear polarized lights. In this embodiment, the entering lights are converted into S-polarized lights perpendicular to the light entrance surface by the polarization converting element 24.

Then, the emission light from the illumination device 2 divided into plural partial lights and converted into lights having the equalized polarization direction is supplied to the color separating device 3.

The color separating device 3 has function of separating the light emitted from the illumination device 2 into three color lights of red light (R), green light (G), and blue light (B), and includes dichroic mirrors 31 and 32, and reflection mirrors 33, 34, and 35.

The dichroic mirrors 31 and 32 are optical elements each of which is disposed inclined to an optical path center axis of light substantially at 45 degrees and has a dielectric multilayer film on a transparent substrate made of BK7, quartz glass or the like. Each of the dielectric multilayer films of the dichroic mirrors 31 and 32 has function of reflecting light in a particular wavelength range and transmitting light in the other range to separate the light into plural color lights. The dichroic mirror 31 disposed on the upstream side on the optical path reflects the red light (R) and transmits the other green light (G) and blue light (B). The dichroic mirror 32 disposed on the downstream side on the optical path reflects the green light (G) and transmits the blue light (B).

The reflection mirrors 33, 34, and 35 are optical elements each of which directs the red light (R) and the blue light (B) separated by the dichroic mirrors 31 and 32 toward the liquid crystal panels 51R and 51B included in the image forming device 5, and contains a total-reflection mirror.

The relay device 4 is disposed on the optical path of the blue light (B) separated by the color separating device 3. The relay device 4 contains two converging lenses 41 and 42 provided on the optical path to direct the blue light (B) toward the liquid crystal panel 51B for blue light.

Though not shown in the figure, the red light (R) and the green light (G) separated by the color separating device 3 enter entrance side polarization plates 52R and 52G included in the image forming device 5 via field lenses.

The image forming device 5 includes the three liquid crystal panels 51R, 51G, and 51B, the entrance side polarization plates 52R, 52G, and 52B disposed on the upstream side of the liquid crystal panels 51R, 51G, and 51B, and exit side polarization plates 53R, 53G, and 53B disposed on the downstream side of the liquid crystal panels 51R, 51G, and 51B.

Each of the liquid crystal panels 51R, 51G, and 51B has the image forming area containing liquid crystals as electro-optic substances sealed between a pair of transparent glass substrates. The image forming areas modulate the polarization directions of the polarized lights having passed through the entrance side polarization plates 52R, 52G, and 52B by controlling the orientation conditions of the liquid crystals according to inputted image information. Predetermined linear polarized lights contained in the modulated lights by the liquid crystal panels 51R, 51G, and 51B pass through the exit side polarization plates 53R, 53G, and 53B, and the other polarized lights are absorbed by the exit side polarization plate 53R, 53G, and 53B such that an optical image can be formed. The lights modulated by the image forming device 5 having this structure are supplied to the color combining device 6.

In this embodiment, retardation films are laminated on each of the entrance side polarization plates 52R and 52B. The S-polarized lights received from the polarization converting element 24 discussed above are converted into P-polarized lights parallel with the entrance surface and supplied to the liquid crystal panels 51R and 51B. Then, the exit side polarization plates 53R and 53B transmit the S-polarized lights contained in the lights modulated by the liquid crystal panels 51R and 51B, and supply the S-polarized lights to the color combining device 6.

The entrance side polarization plate 52G does not convert the phase of the light but transmits the received S-polarized light without change toward the liquid crystal panel 51G. The exit side polarization plate 53G transmits P-polarized light contained in the lights modulated by the liquid crystal panel 51G and supplies the P-polarized light to the color combining device 6. Thus, the color combining device 6 receives the red light and blue light as S-polarized lights, and the green light as P-polarized light.

The color combining device 6 has function of forming a color image by combining the modulated lights received from the respective exit side polarization plates 53R, 53G, and 53B. The color combining device 6 has a substantially square shape in the plan view produced by affixing four rectangular prisms. The color combining device 6 is a cross dichroic prism containing two dielectric multilayer films provided on the interfaces between the respective rectangular prisms.

One of the two dielectric multilayer films reflects red light (R) and transmits green light (G). The other dielectric multilayer film reflects blue light (B) and transmits green light (G). By utilizing these characteristics of the dielectric multilayer films, the red light (R), green light (G), and blue light (B) are combined to form a color image. The light supplied from the color combining device 6 contains the red light (R) and blue light (B) as S-polarized lights, and the green light (G) as P-polarized light.

Though not shown in FIG. 1, the projecting device 7 has a combined lens which contains plural lenses within a lens barrel with their optical axes aligned to project the optical image formed by the color combining device 6 on the screen S.

The projector includes the wavelength selective polarization rotation element 8, the image forming system 9, and the polarized light emitting unit between the color combining device 6 and the projecting device 7.

The wavelength selective polarization rotation element 8 is an optical element disposed at a position receiving light from the color combining device 6 to selectively rotate the polarization direction of any of the color lights separated by the dichroic mirrors 31 and 32. In this embodiment, the wavelength selective polarization rotation element 8 rotates the polarization direction of the green light (G) contained in the received light by 90 degrees. Thus, the wavelength selective polarization rotation element 8 selectively rotates the polarization direction of the green light (G) as P-polarized light contained in the received light to convert the green light (G) into S-polarized light. Thus, all of the red light (R), the green light (G), and the blue light (B) supplied from the wavelength selective polarization rotation element 8 become S-polarized lights. The wavelength selective polarization rotation element 8 is an optical element produced by laminating a plurality of drawn polymeric films made of polymeric material such as polyvinyl alcohol, polycarbonate, polypropylene, polystyrene, triacetate, and polymethyl methacrylate.

The image forming system 9 is an optical element constituted by a combination of convex and concave lenses to form an image corresponding to the optical image received from the color combining device 6 at a position shifted from the projecting device 7 toward the image forming device 5. The polarized light emitting unit 10 is disposed at the position corresponding to the image forming position of the image forming system 9. The position of the polarized light emitting unit 10 also corresponds to the back focus position of the projecting device 7.

The polarized light emitting unit 10 is an optical element disposed at the image forming position of the image forming system 9 to selectively convert the polarization direction of a part of the entering light. More specifically, the polarized light emitting unit 10 selectively converts a part of the S-polarized light received from the wavelength selective polarization rotation element 8 into P-polarized light. The polarized light emitting unit 10 alternately supplies two types of linear polarized lights, that is, P-polarized light parallel with the entrance surface and S-polarized light perpendicular to the entrance surface according to the pixel arrangements of the image forming areas of the liquid crystal panels 51R, 51G, and 51B.

Figure 2:
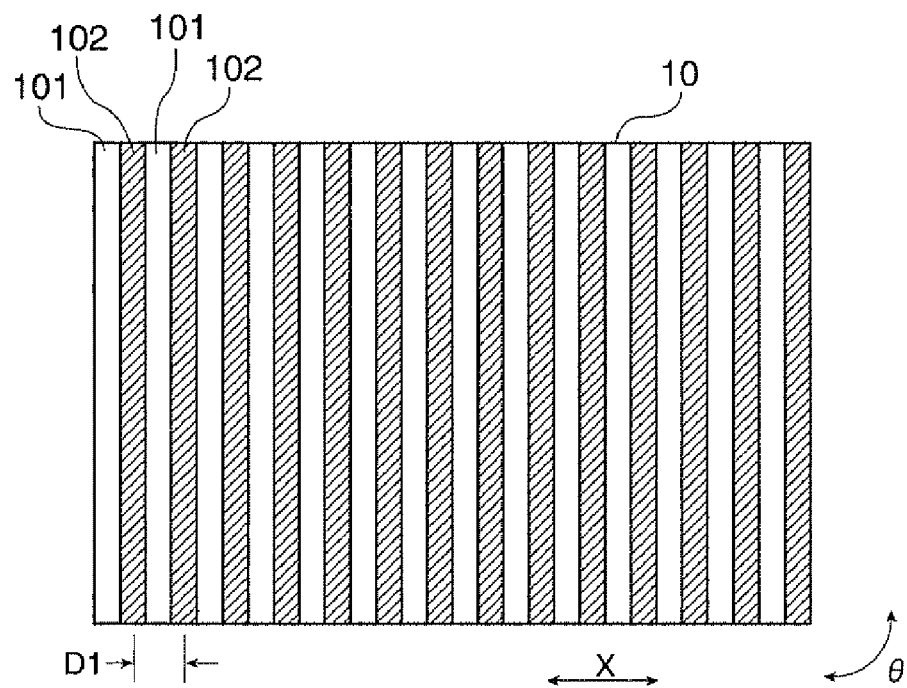
FIG. 2 schematically illustrates the structure of a polarized light emitting unit according to the first embodiment.

As illustrated in FIG. 2, the polarized light emitting unit 10 has retardation films 102 affixed to a substrate 101 in a stripe pattern. An affixing pitch D1 of the retardation films 102 is set at a pitch twice longer than the pixel pitch of the optical image formed at the image forming position. The arrangement direction of the retardation films 102 corresponds to the X axis direction in FIG. 1, i.e., the left-right direction of the projection image. Though not shown in FIG. 2, the polarized light emitting unit 10 has a position control unit for controlling the position of the polarized light emitting unit 10. The position control unit has an X-axis shift mechanism for controlling the position of the polarized light emitting unit 10 in the X axis direction, and a θ rotation shift mechanism for controlling the position of the polarized light emitting unit 10 in an in-plane rotation direction θ. The position control unit is actuated by a stepping motor or other drive units.

Figure 3:
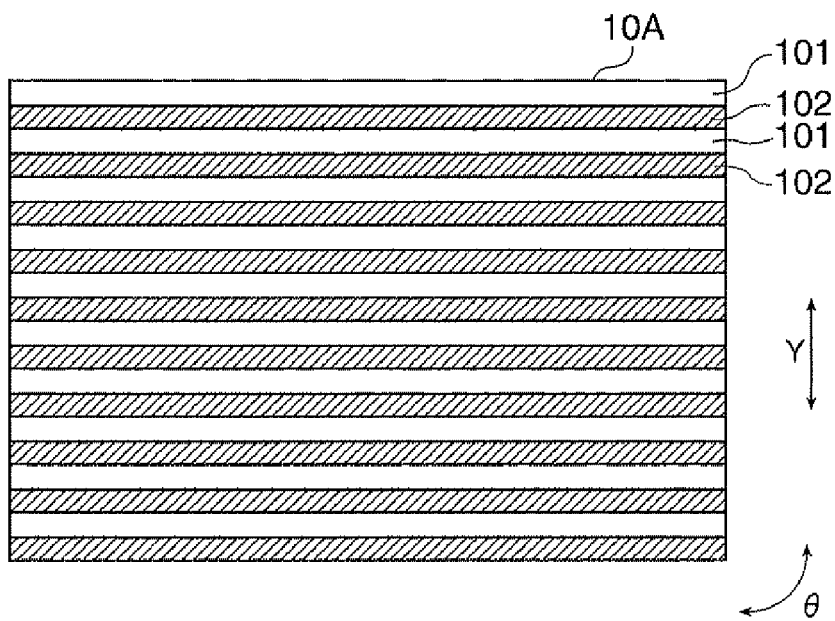
FIG. 3 schematically illustrates the structure of a polarized light emitting unit according to a modified example of the first embodiment.
Figure 4:
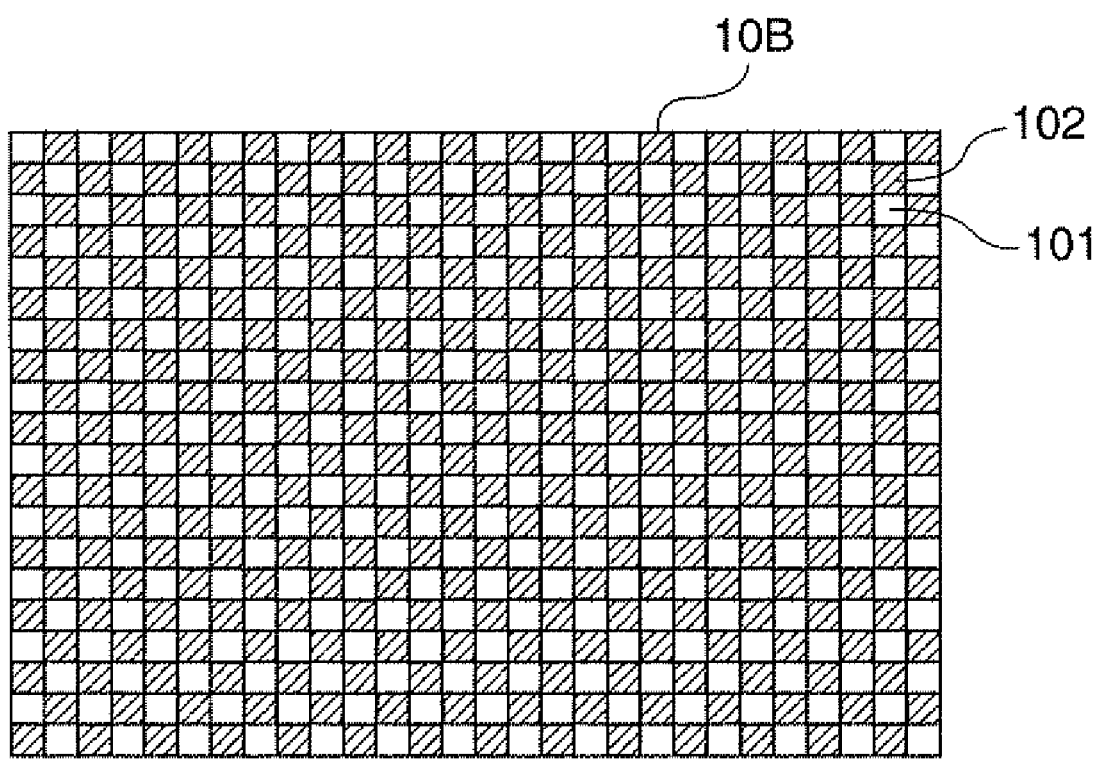
FIG. 4 schematically illustrates the structure of a polarized light emitting unit according to another modified example of the first embodiment.
Figure 5:
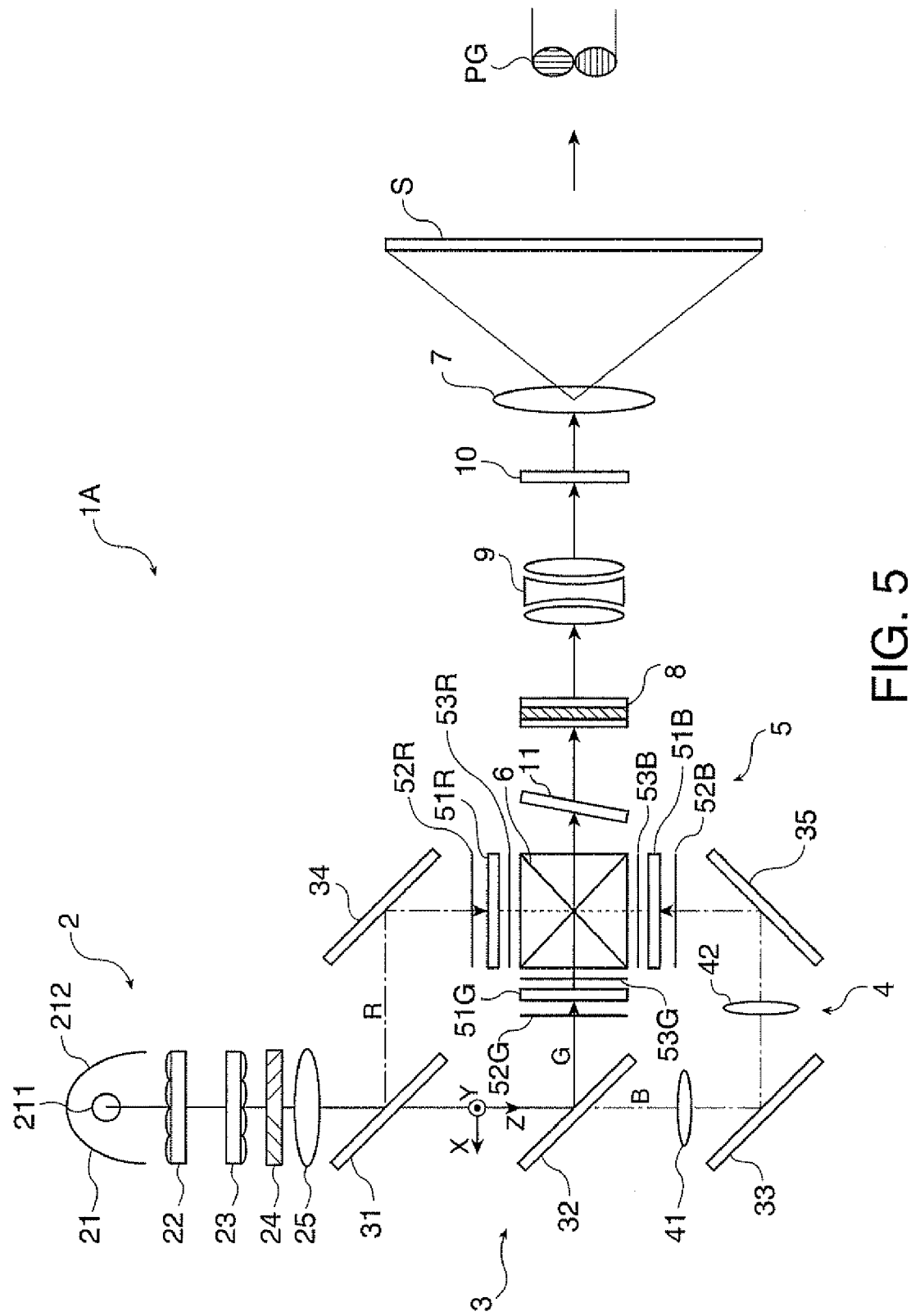
FIG. 5 schematically illustrates optical systems of a projector according to a second embodiment of the invention.

The polarized light emitting unit is not limited to the component containing retardation films arranged in the left-right direction of the projection image, but may be a polarized light emitting unit 10A containing retardation films 102 disposed in a stripe pattern in the up-down direction of the projection image, i.e., in the Y axis direction shown in FIG. 3, or a polarized light emitting unit 10B containing the retardation films 102 disposed in a checkered pattern as a scattered arrangement shown in FIG. 4, for example.

In case of the polarized light emitting unit 10A, the position control unit for controlling the relative positions of the polarized light emitting unit 10A and the liquid crystal panels 51R, 51G, and 51B has a Y-axis shift mechanism and the θ rotation shift mechanism. In case of the polarized light emitting unit 10B, the position control unit has the X-axis shift mechanism, the Y-axis shift mechanism, and the θ rotation shift mechanism. Each arrangement pitch of the polarized light emitting units 10A and 10B is set at a pitch twice longer than the pixel pitch of the liquid crystal panels 51R, 51G, and 51B similarly to the polarized light emitting unit 10.

For displaying a three-dimensional image by using the projector 1 having this structure, respective parallax image data for the left eye and for the right eye are created, and the parallax image data for the left eye and the parallax image data for the right eye are alternately combined on a frame buffer of an image processing circuit. For example, image data for display is produced such that the parallax image data for the left eye is displayed in the odd number pixel rows of the frame buffer and that the parallax image data for the right eye is displayed in the even number pixel rows of the frame buffer. Then, the liquid crystal panels 51R, 51G, and 51B are operated based on the produced image data.

Almost all light emitted from the light source is converted into S-polarized light by the polarization converting element 24, and separated into color lights R, G, and B by the color separating device 3. Then, the color lights R and B are converted into P-polarized lights by the entrance side polarization plates 52R and 52B, and modulated into S-polarized lights by the liquid crystal panels 51R, and 51B. Subsequently, the modulated color lights R and B are reflected by the dielectric multilayer films of the color combining device 6 to enter the image forming system 9.

On the other hand, the color light G enters the liquid crystal panel 51G as the S-polarized light without change. Then, the color light G modulated into P-polarized light by the liquid crystal panel 51G forms an optical image, and passes through the color combining device 6. Subsequently, the color light G is converted into S-polarized light by the wavelength selective polarization rotation element 8 and supplied to the image forming system 9.

The optical image constituted by the color lights R, G and B having the equalized polarization direction forms an image on the polarized light emitting unit 10 by the function of the image forming system 9. The polarization directions of the lights contained in the lights constituting the optical image formed on the polarized light emitting unit 10 and located in the even number rows of the image forming areas of the liquid crystal panels 51R, 51G, and 51B are rotated by 90 degrees to be supplied as P-polarized lights and projected on the screen S through the projecting device 7. On the other hand, the lights in the odd number rows of the liquid crystal panels 51R, 51G, and 51B are projected on the screen S as S-polarized lights without change.

An observer observes a three-dimensional image displayed on the screen S via polarization glasses PG having different polarization directions for the left eye and the right eye.

When difference is produced between the parallax image for the left eye and the parallax image for the right eye on the projection image, the position of the polarized light emitting unit 10 is adjusted by the position control unit discussed above to display an appropriate three-dimensional image.

In case of normal display, the projector 1 displays a projection image on the screen S according to inputted normal image data. In this case, the observer observes the projection image without using the polarization glasses PG.

Second Embodiment

A second embodiment of the invention is now described. In the following explanation, similar reference numbers are given to parts similar to those in the first embodiment described above, and the same explanation is not repeated.

In the first embodiment, the relative positions of the liquid crystal panels 51R, 51G, and 51B and the polarized light emitting unit 10 are adjusted by controlling the position of the polarized light emitting unit 10 using the position control unit (not shown) having the X-axis shift mechanism and the θ rotation shift mechanism.

According to a projector 1A in this embodiment, however, the relative positions of the liquid crystal panels 51R, 51G, and 51B and the polarized light emitting unit 10 are adjusted by controlling an angle formed by an optical path center axis and a transparent parallel plate 11 disposed at a position receiving light from the color combining device 6.

Figure 6:
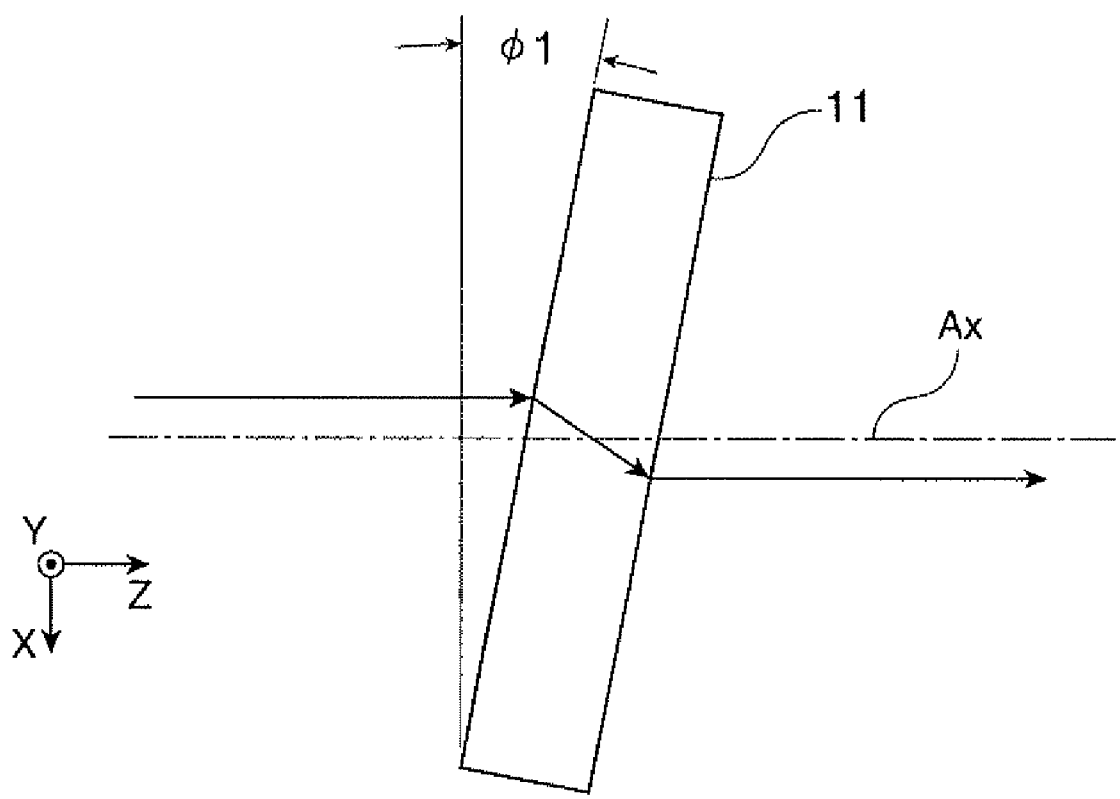
FIG. 6 is a plan view showing the structure of a transparent parallel plate according to the second embodiment.

As illustrated in FIG. 6, the transparent parallel plate 11 is a transparent substrate disposed inclined to an optical path center axis Ax, and having a light entrance surface and a light exit surface parallel with each other. The transparent parallel plate 11 is made of transparent glass material such as BK7. When disposed on the optical path of the projector 1A, the transparent parallel plate 11 having this structure receives light in an oblique direction and refracts the light within the transparent parallel plate 11 to shift the optical path of the light before releasing the light.

The position control unit in this embodiment has the transparent parallel plate 11, and an angle control unit (not shown)

for changing the inclination angle of the transparent parallel plate 11. The angle control unit may have any known mechanisms as long as they can hold the end of the transparent parallel plate 11 and control an angle φ1 formed by the transparent parallel plate 11 and the X axis.

According to this embodiment, the relative positions of the liquid crystal panels 51R, 51G, and 51B and the polarized light emitting unit 10 can be adjusted by controlling the angle φ1 of the transparent parallel plate 11 using the position control unit. That is, fine adjustment of the relative positions can be performed by changing the inclination angle. Thus, a three-dimensional image produced in this embodiment can be further easily recognized by the observer.

Modification of Embodiments

The invention is not limited to the embodiments described herein but includes the following modifications.

According to the embodiments, the polarized light emitting unit 10, 10A, or 10B is included in the projector 1 having the three plates of the liquid crystal panels 51R, 51G, and 51B. However, the invention is applicable to a single plate type liquid crystal projector. Moreover, the invention is applicable to a light modulating device such as a reflection type liquid crystal panel and a micro-mirror type light modulating device as well as the transmission type light modulating device used in the embodiments.

According to the embodiments, the parallax image for the left eye and the parallax image for the right eye are formed by using two types of linear polarized lights. However, the parallax image for the left eye may be formed by anticlockwise circular polarized lights, and the parallax image for the right eye may be formed by clockwise circular polarized lights.

According to the embodiments, the polarized light emitting unit 10 is produced by affixing the retardation films 102 to the substrate 101. However, the polarized light emitting unit 10 or 10A shown in FIGS. 2 and 3 may be manufactured by laminating transparent glass substrates and retardation films having predetermined thicknesses and slicing the laminations in the laminating direction.

Other specific structures and shapes shown in the embodiments may be modified without departing from the scope of the invention.

The entire disclosure of Japanese Patent Application No. 2009-088696, filed Apr. 1, 2009 is expressly incorporated by reference herein.

What is claimed is:

1. A projector, comprising:
 a light source which emits light;
 a light modulating device which modulates the light emitted from the light source according to image information;
 an image forming system which forms an image of modulated light which is modulated by the light modulation device at an image forming position;
 a polarized light emitting unit disposed at the image forming position of the image forming system to selectively convert the polarization direction of a part of entering light; and
 a projecting device which projects the light from the polarized light emitting unit,
 wherein the polarized light emitting unit has a substrate on which an area having a retardation film and an area having no retardation film are alternately formed according to pixel arrangement of the light modulating device.

2. The projector according to claim 1, further comprising:
 a color separation element which separates the light emitted from the light source into a plurality of color lights;
 a plurality of light modulating devices each of which modulates the corresponding color light separated by the color separation element;
 a color combining device which combines modulated lights, each of which is modulated by the respective light modulating devices; and
 a wavelength selective polarization rotation element disposed at a position receiving light from the color combining device to selectively rotate the polarization direction of any color light contained in the color lights.

3. The projector according to claim 1, further comprising a position control unit which controls the relative positions of the light modulating device and the polarized light emitting unit.

4. The projector according to claim 3, wherein the position control unit is a transparent parallel plate disposed inclined to an optical center axis at a position receiving light from the light modulating device.

5. The projector according to claim 3, wherein the position control unit is a mechanical position control mechanism which can control the position of the polarized light emitting unit within a plane containing a light entrance surface of the polarized light emitting unit.

* * * * *